US012659388B2

(12) United States Patent
Hart

(10) Patent No.: US 12,659,388 B2
(45) Date of Patent: Jun. 16, 2026

(54) VENDOR-SPECIFIC PPDU FORMAT FOR WI-FI8

(71) Applicant: Cisco Technology, Inc., San Jose, CA (US)

(72) Inventor: Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 295 days.

(21) Appl. No.: 18/452,461

(22) Filed: Aug. 18, 2023

(65) Prior Publication Data

US 2025/0008004 A1     Jan. 2, 2025

Related U.S. Application Data

(60) Provisional application No. 63/510,854, filed on Jun. 28, 2023.

(51) Int. Cl.
| | |
|---|---|
| *H04L 69/22* | (2022.01) |
| *H04L 5/00* | (2006.01) |
| *H04L 27/00* | (2006.01) |
| *H04L 69/12* | (2022.01) |
| *H04W 84/12* | (2009.01) |

(52) U.S. Cl.
CPC ............ *H04L 69/22* (2013.01); *H04L 5/0044* (2013.01); *H04L 27/0008* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2014/0010223 A1* | 1/2014 | Wang .................... | H04W 48/12 |
| | | | 370/338 |
| 2019/0069275 A1* | 2/2019 | Kawasaki ............. | H04W 72/02 |
| 2021/0044511 A1 | 2/2021 | Connolly et al. | |
| 2021/0273838 A1 | 9/2021 | Park et al. | |
| 2022/0277639 A1* | 9/2022 | Vishnoi ............... | G08B 21/245 |
| 2023/0156781 A1 | 5/2023 | Chen et al. | |
| 2023/0283421 A1* | 9/2023 | Lim ...................... | H04L 1/1893 |
| | | | 370/338 |

(Continued)

FOREIGN PATENT DOCUMENTS

| | | |
|---|---|---|
| AU | 2013247949 B2 | 8/2017 |
| WO | 2022081873 A1 | 4/2022 |
| WO | 2022170851 A1 | 8/2022 |

OTHER PUBLICATIONS

Pedro Julio et al., "Stub Wireless Multi-Hop Networks Using Self-Configurable Wi-Fi Basic Service Set Cascading," IEEEXplore, Dated: May 4, 2017 [Abstract Only].

(Continued)

*Primary Examiner* — Duc T Duong

(74) *Attorney, Agent, or Firm* — Patterson + Sheridan, LLP

(57) ABSTRACT

A format for a Physical layer Protocol Data Unit (PPDU) that can be transmitted over a network is disclosed. The PPDU includes a field having one or more bits identifying whether a vendor-specific signal field (VS-SIG) is present in the PPDU. When present, the VS-SIG includes one or more bits identifying a vendor-specific language in which vendor-specific data is presented. The VS-SIG also includes one or more bits representing the vendor-specific data in the vendor-specific language.

17 Claims, 7 Drawing Sheets

(56)  References Cited

U.S. PATENT DOCUMENTS

| | | | |
|---|---|---|---|
| 2023/0388165 A1* | 11/2023 | Yu ....................... | H04L 27/2602 |
| 2024/0080660 A1* | 3/2024 | Kneckt ................... | H04W 8/24 |
| 2024/0430703 A1* | 12/2024 | Mccann ................ | H04W 24/02 |

OTHER PUBLICATIONS

International Search Report and Written Opinion for International Application No. PCT/US2024/034928, mailed Oct. 15, 2024, 14 Pages.

* cited by examiner

VENDOR-SPECIFIC PPDU FORMAT FOR WI-FI8

CROSS-REFERENCE TO RELATED APPLICATIONS

This application claims benefit of U.S. provisional patent application Ser. No. 63/510,854 filed Jun. 28, 2023. The aforementioned related patent application is herein incorporated by reference in its entirety.

TECHNICAL FIELD

Embodiments presented in this disclosure generally relate to Physical layer Protocol Data Units (PPDUs) that can be transmitted over a network, such as an IEEE 802.11 network.

BACKGROUND

Some IEEE 802.11 vendors seek to add proprietary Physical Layer (PHY) features to Physical layer Protocol Data Units (PPDUs), and to have such features understood by their other stations without confusing third-party stations on a network. Conventionally, vendors have utilized reserved bits in the PHY header signal fields to add such proprietary PHY features to a PPDU. However, the reserved bits in the PHY header are non-robust, especially for future amendments, because different vendors can use them in different ways. Haphazard use of the reserved bits can lead to confusion on the network.

Accordingly, an improved PPDU format for managing vendor-specific features is needed.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
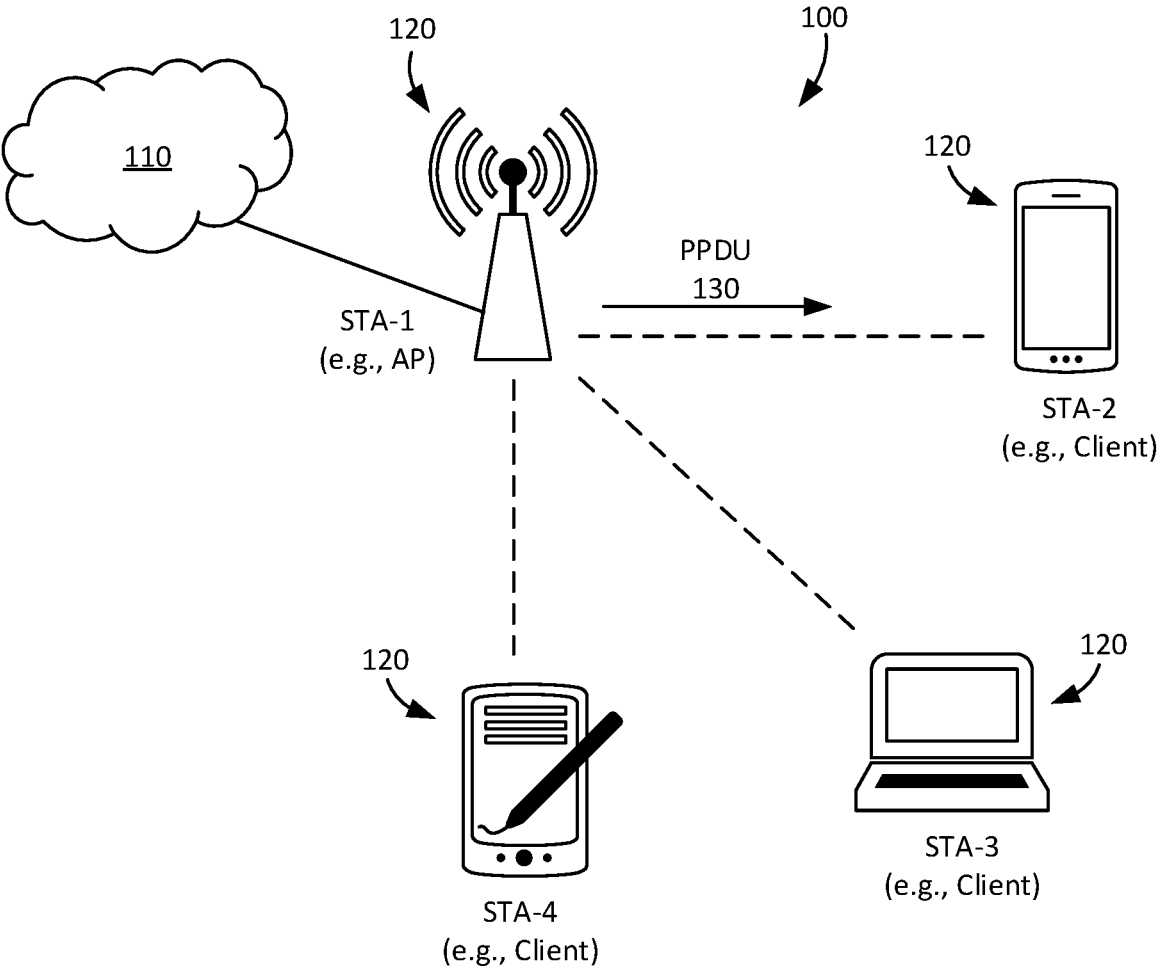
FIG. 1 is a schematic diagram of a wireless local area network (WLAN) system according to one or more embodiments.

One embodiment presented in this disclosure is a method. The method includes performing at least one of: generating, transmitting, and receiving a physical layer protocol data unit (PPDU), the PPDU includes a payload and a preamble. The preamble includes a field having one or more bits identifying whether a vendor-specific signal field (VS-SIG) is present in the PPDU. The preamble also includes the VS-SIG, which includes one or more bits identifying a vendor-specific language in which vendor-specific data is presented. The preamble further includes one or more bits representing the vendor-specific data in the vendor-specific language.

Another embodiment presented in this disclosure is a non-transitory, computer readable medium that includes instructions that, when executed by one or more processors, cause the one or more processors to perform an operation. The operation includes generating a physical layer protocol data unit (PPDU). The PPDU includes a payload and a preamble. The preamble includes a field having one or more bits identifying whether a vendor-specific signal field (VS-SIG) is present in the PPDU. When present, the VS-SIG of the preamble includes i) one or more bits identifying a vendor-specific language in which vendor-specific data is presented; and ii) one or more bits representing the vendor-specific data in the vendor-specific language.

Yet another embodiment presented in this disclosure is a system. The system includes one or more processors and one or more memory devices storing a program executable by the one or more processors to perform an operation. The operation includes generating or receiving a physical layer protocol data unit (PPDU). The PPDU includes a payload a preamble. The preamble includes a field having one or more bits identifying whether a vendor-specific signal field (VS-SIG) is present in the PPDU, and, when present, the VS-SIG includes i) one or more bits identifying a vendor-specific language in which vendor-specific data is presented; and ii) one or more bits representing the vendor-specific data in the vendor-specific language.

In a further embodiment presented in this disclosure, a method is provided. The method includes receiving, by a station, a physical layer protocol data unit (PPDU), the PPDU includes a field having one or more bits identifying whether a vendor-specific signal field (VS-SIG) is present in the PPDU, the VS-SIG, when present, includes one or more bits identifying a vendor-specific language in which vendor-specific data is presented and one or more bits representing the vendor-specific data in the vendor-specific language. Further, the method includes determining, by the station, whether the PPDU includes the VS-SIG. The method also includes, in response to determining that the PPDU includes the VS-SIG, ascertaining, by the station, whether the station supports the vendor-specific language. The method further includes, in response to ascertaining that the station supports the vendor-specific language, processing, by the station, the PPDU in accordance with the vendor-specific data.

Example Embodiments

A novel 802.11 Physical Layer (PHY) format for a Physical layer Protocol Data Unit (PPDU) is disclosed. In accordance with inventive aspects of this disclosure, a PPDU arranged in the novel format can include, among other things, a vendor-specific signal field representing vendor-specific data. One or more bits indicating whether a vendor-specific signal field is present in the PPDU can also be included. The vendor-specific data, or vendor-specific PHY features, can be represented in a vendor-specific language that can be understood by only the vendor, and in some instances, one or more other vendors (e.g., a partner of the vendor). This advantageously allows vendors to send vendor-specific data in a non-standard, vendor-specific language—but according to a standardized protocol—so as not to affect operation of third-party stations that do not understand the vendor-specific language presented in the PPDU. Example embodiments detailing the inventive aspects are presented below.

FIG. 1 is a schematic diagram of an example Wireless Local Area Network (WLAN), or WLAN 100, according to one or more embodiments. In the depicted embodiment of FIG. 1, the WLAN 100 is configured as an IEEE 802.11 WLAN that is connected to a Wide Area Network (WAN), or WAN 110, such as the internet. For the depicted embodiment of FIG. 1, the WLAN 100 includes a plurality of stations (STAs) 120, including a first station STA-1, a second station STA-2, a third station STA-3, and a fourth station STA-4. The first station STA-1 is configured as an Access Point (AP) and the second, third, and fourth stations STA-2, STA-3, STA-4 are configured as clients that are wirelessly connected with the first station STA-1. The first station STA-1, or AP in this example embodiment, can manage the non-AP or client stations. More or less than four (4) stations can be included in the WLAN 100 in other example embodiments.

Any of the stations STA-1, STA-2, STA-3, STA-4 can generate and transmit a PPDU. One station can transmit a PPDU to one or more other stations. For instance, in FIG. 1, the first station STA-1 is shown transmitting a PPDU 130 to the second station STA-2. In accordance with inventive aspects of this disclosure, the PPDU 130 can have a unique 802.11 PHY format that includes, among other things, a vendor-specific signal field representing vendor-specific data. The vendor-specific data can include, for example, data indicating modulation orders, new Forward Error Correction (FEC) codes, a technique for applying channel smoothing, features of improved ranging, etc. Introduction of the vendor-specific signal field can, among other benefits, can allow vendors to include vendor-specific PHY features in the PPDU whilst not affecting or reducing an effect on third-party stations on the network. For instance, the PPDU 130 transmitted from the first station STA-1 to the second station STA-2 in FIG. 1 can advantageously include a vendor-specific signal field that includes vendor-specific PHY features (or vendor-specific data) that does not affect the third and fourth stations STA-3, STA-4. Example PPDU formats that can include a vendor-specific signal field are presented below. In other example embodiments, the PPDU 130 can be directed to more than one STA (e.g., both STA-2 and STA-3), and further some of the recipient STAs may understand the vendor-specific PHY features and some may not.

Figures 2, 3:
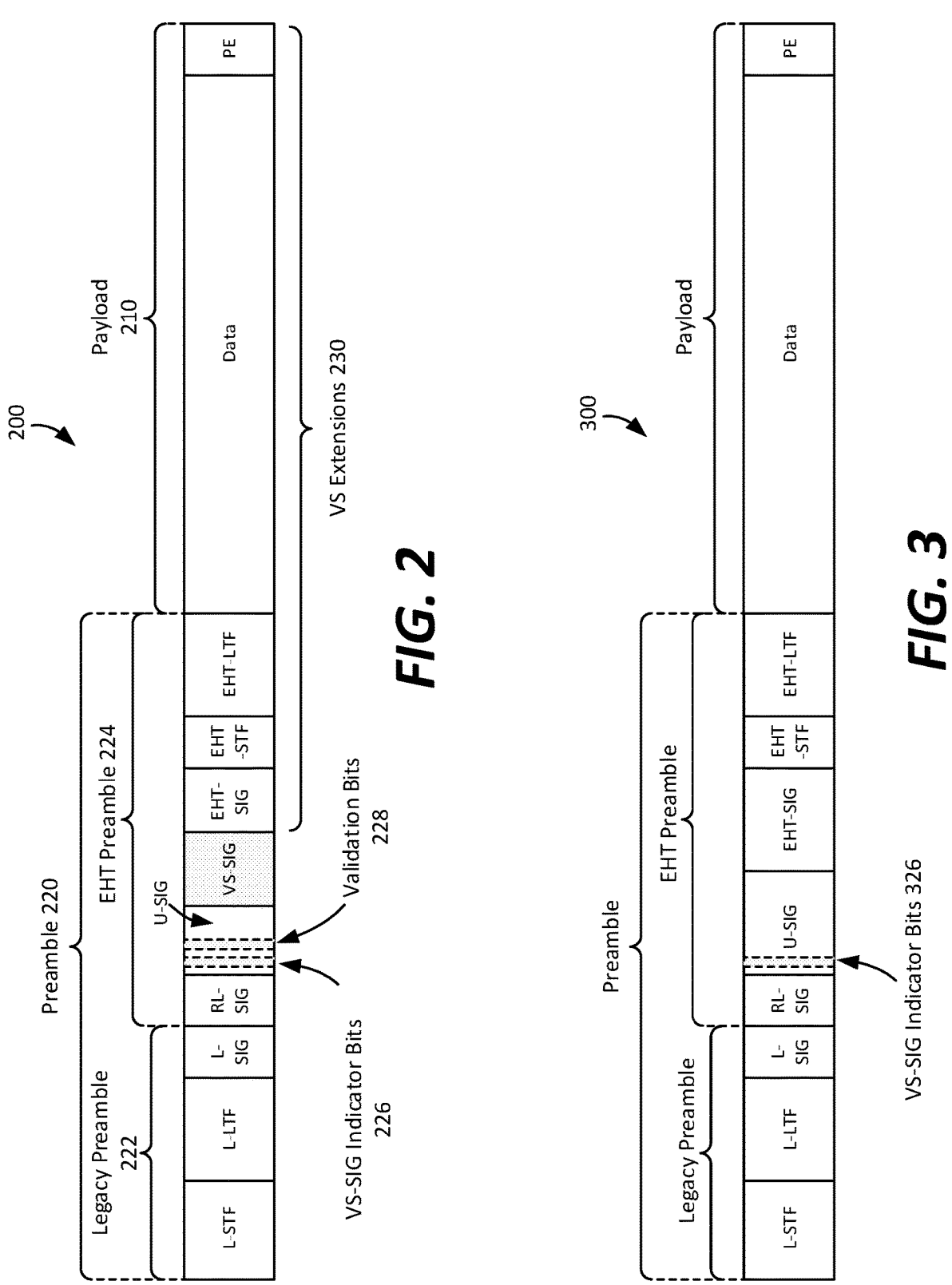
FIG. 2 is an example Physical layer Protocol Data Unit (PPDU) format according to one or more embodiments.
FIG. 3 is another example PPDU format according to one or more embodiments.

FIG. 2 is an example PPDU 200 according to one or more embodiments. The PPDU 200 of FIG. 2 is configured as an example extension to a non-trigger based, Extremely High Throughput (EHT) Multi-User (MU) PPDU for IEEE 802.11 applications. In another embodiment, the EHT fields are replaced by the fields of another PHY amendment (e.g., Ultra High Reliability (UHR) implementations). Generally, the PPDU 200 includes a payload 210 and a preamble 220 that precedes the payload 210. The payload 210 generally includes a Data field that includes data (e.g., non-metadata) and a Packet Extension Field (PE) that terminates the PPDU 200.

For the depicted PPDU 200 of FIG. 2, the preamble 220 includes a legacy preamble 222 and format-specific signal fields, which are collectively referred to as an EHT preamble 224 in this example embodiment. The format-specific signal fields can also be referred to as a header. The inventive aspects disclosed herein also apply to future PHY amendments, such as UHR or Wi-Fi8 amendments.

The legacy preamble 222 includes three (3) fields, including a Legacy Short Training Field (L-STF), a Legacy Long Training Field (L-LTF), and a Legacy Signal Field (L-SIG). The L-STF can include a unique waveform for detection by a receiver of the PPDU 200. The receiver, or receiving station, can use the waveform for initializing packet detection, automatic gain control, initial frequency offset estimation, initial time synchronization, a combination thereof, etc. The L-LTF includes a unique waveform as well, which is different from the L-STF waveform. A receiver of the PPDU 200 can use this waveform for channel estimation and more accurate frequency offset estimation and time synchronization. The L-SIG can include rate, length, and parity information associated with a legacy Orthogonal Frequency Division Multiplexing (OFDM) PPDU but is still used to indicate the duration of more modern PPDUs. The L-SIG can be represented by one OFDM symbol, for example.

The EHT preamble 224 includes various format-specific data fields as shown in FIG. 2. Particularly, the EHT preamble 224 includes a Repeated Legacy Signal Field (RL-SIG), a Universal Signal Field (U-SIG), an EHT Signal Field (EHT-SIG), an EHT Short Training Field (EHT-STF), and an EHT Long Training Field (EHT-LTF). Generally, such signal fields can include signaling data as will be appreciated. In another embodiment, these EHT fields are replaced by the fields defined for another PHY amendment (e.g., UHR).

In accordance with the inventive aspects of this disclosure, the PPDU 200 includes a field having one or more bits identifying whether a Vendor-Specific Signal Field (VS-SIG) is present in the PPDU 200. Such bits can be deemed "VS-SIG indicator bits", or VS-SIG indicator bits 226. For the depicted embodiment of FIG. 2, the field having the VS-SIG indicator bits 226 identifying whether the VS-SIG is present in the PPDU 200 is the U-SIG. However, in other embodiments, the field having the VS-SIG indicator bits 226 identifying whether a VS-SIG is present in the PPDU 200 can be in another field, such as in any other field in the legacy preamble 222 or the EHT preamble 224 (or more broadly the format-specific signal fields). Also, as depicted in FIG. 2, the one or more bits identifying whether the VS-SIG is present in the PPDU 200, or VS-SIG indicator bits 226, are in a field other than the VS-SIG itself.

In some further embodiments, a single bit in the field (e.g., the U-SIG) can represent whether a VS-SIG is present in the PPDU. For instance, the single bit can represent a "YES" or a "NO" to identify whether the VS-SIG is present in the PPDU 200. In yet other embodiments, a plurality of bits in the field (e.g., the U-SIG) can identify whether the VS-SIG is present in the PPDU 200 as well as other potential information associated with the VS-SIG, such as whether vendor-specific data in the VS-SIG is or should be configured or represented as one OFDM symbol or two OFDM symbols.

In FIG. 2, the VS-SIG indicator bits 226 can represent that a VS-SIG is in fact present in the PPDU. Indeed, in FIG. 2, the VS-SIG is positioned between the U-SIG and the EHT-SIG. However, the VS-SIG can be positioned elsewhere in the preamble 220 of the PPDU 200, such as between the EHT-SIG and the EHT-STF. In contrast, in FIG. 3, which depicts another PPDU 300 configured as a non-trigger based, EHT MU PPDU for IEEE 802.11 applications, the one or more bits identifying whether a VS-SIG is present in the PPDU 300, or VS-SIG indicator bits 326, can represent that a VS-SIG is not present in the PPDU 300. As illustrated, the VS-SIG is absent in FIG. 3. In this regard, even when the VS-SIG is not present in a PPDU, the PPDU can nevertheless include the one or more bits identifying whether a VS-SIG is present in the PPDU.

With reference again to FIG. 2, in some embodiments, advantageously, the field having the VS-SIG indicator bits 226 is positioned before the VS-SIG, or rather, before the VS-SIG in the PPDU 200. In FIG. 2, the field (e.g., the U-SIG) having the VS-SIG indicator bits 226 is positioned before or forward of the VS-SIG. Such an arrangement allows a receiver, or receiving station, to know that the VS-SIG is present and, if so, then to demodulate, decode, and attempt to interpret the VS-SIG bits or to know that the VS-SIG field is not present and, if so, then skip directly to processing the next field. Further, embodiments are contemplated where the VS-SIG indicator bits 226 are in a field that is after the VS-SIG.

In accordance with yet further inventive aspects of this disclosure, optionally, a PPDU can include one or more bits indicating whether a receiving station of the PPDU is required to perform a validation operation. Such bits can be deemed "validation bits", or validation bits 228, as illustrated in FIG. 2. The one or more validation bits 228 can be a separate field (1 bit in length) or associated with value(s) in a multi-bit field. For instance, in FIG. 2, the validation bits are shown being present within the U-SIG. In other embodiments, the one or more validation bits 228 can be present within the VS-SIG itself, within its own dedicated field (or validate signaling field), or in some other field of the preamble 220. The one or more validation bits 228 are preferably positioned before the VS-SIG. Depending on whether validation is required to be performed by a receiving station of the PPDU 200 and whether the vendor-specific language, or VS language, in the PPDU 200 is understood or supported by the receiving station, the PPDU 200 can be processed differently by the receiving station. For instance, if there is no "Validate signaling" in the PPDU 200 as signaled by the one or more validation bits 228, then the recipient or receiving station can process a VS-SIG (when present) if the recipient understands or supports at least one vendor-specific language and further only continue to process the remainder of the PPDU 200 if the recipient understands and at least minimally supports the specific vendor-specific language signaled in the validation bits 228 in the PPDU 200.

In accordance with yet further inventive aspects of this disclosure, the VS-SIG, when present, includes one or more bits identifying a vendor-specific language in which vendor-specific data is presented and one or more bits representing the vendor-specific data in the vendor-specific language. The vendor-specific language can be specific to a vendor or can be a language that the vendor and one or more other vendors are capable of understanding, such as by an agreement or by permission. The vendor-specific data can include vendor-specific metadata that provides instructions on how to process the rest of the PPDU, which, notably, can include vendor-specific extensions, such as a higher modulation, a waveform more amenable to a specific kind of channel smoothing, etc. The vendor-specific extensions, or VS extensions 230, are shown modifying the PPDU 200 in FIG. 2. In this regard, the VS extensions 230 are modifications to the PPDU 200 as instructed by VS metadata in the VS-SIG and are presented in the VS language. Example manners in which a VS-SIG can be constructed are presented below.

Figure 4:
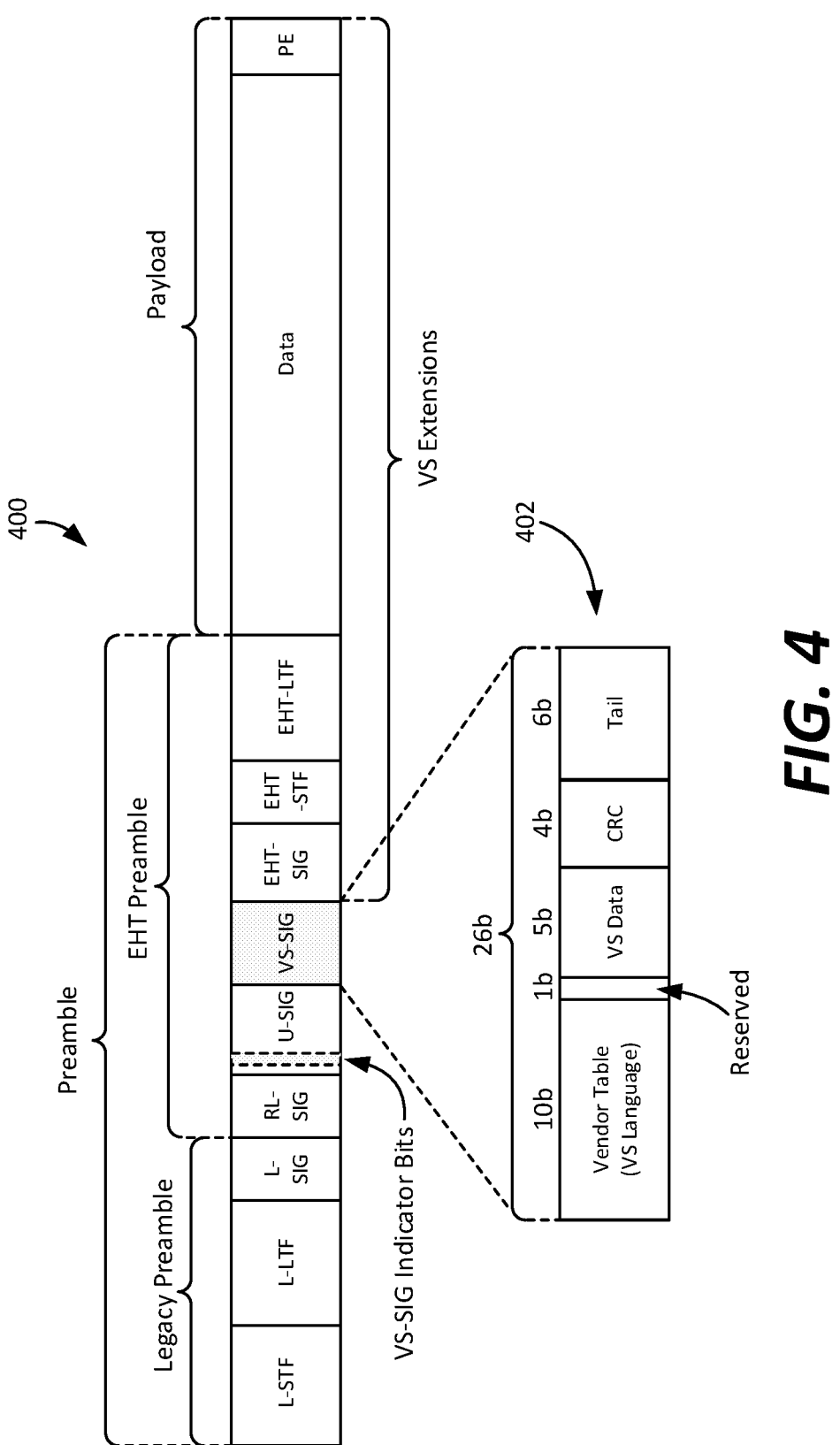
FIG. 4 provides a detailed view of one example format for a VS-SIG of a PPDU according to one or more embodiments.

FIG. 4 provides a detailed view of one example format for a VS-SIG 402 of a PPDU 400 according to one or more embodiments. For the depicted embodiment of FIG. 4, the VS-SIG 402 is represented by a single OFDM symbol and contains twenty-six (26) data bits and fifty-two (52) data subcarriers. The twenty-six (26) data bits can be modulated via Binary Phase-Shift Keying (BPSK)-r1/2, for example. In this regard, the VS-SIG can be a BPSK-modulated OFDM symbol. However, in alternative embodiments, other modulation schemes can be utilized.

As depicted in FIG. 4, the bits associated with the VS-SIG 402 can be allocated into: a Vendor Table, a Reserved field, Vendor-Specific data (or VS data), a Cyclic Redundancy Check (CRC), and a Tail. For the illustrated example embodiment of FIG. 4, ten (10) bits are allocated to the Vendor Table, one (1) bit is allocated to the Reserved field, five (5) bits are allocated to the VS data, four (4) bits are allocated to the CRC, and six (6) bits are allocated to the Tail. It will be appreciated that this is one example allocation of bits and that other allocations are contemplated.

The Vendor Table can include a list of the vendors or implementers of the vendor-specific protocol presented in this disclosure. The Vendor Table can indicate an identity of the vendor transmitting the PPDU 400 (i.e., the vendor whose station is transmitting the PPDU 400) and the vendor-specific language associated with the transmitting vendor. This language may be shared with other vendors if the transmitting vendor wishes them to understand the vendor-specific language. Accordingly, the one or more bits identifying the vendor-specific language in the VS-SIG is represented by the Vendor Table.

The Reserved field can reserve bits for future use, or in some embodiments, the Reserved field can be eliminated or can include zero (0) bits, e.g., so that additional bits can be used for the VS Data. The VS data can include data specific to the vendor that is represented in the vendor's specific language. The VS data can be metadata that describes or provides information relating to data included in the payload, for example. The CRC is a field used to detect errors in the VS-SIG. The Tail is used to terminate the binary convolutional code used in the VS-SIG. The Tail is six (6) bits to terminate the particular BCC code used in the other 802.11 signal fields and proposed here as a default encoding method, but other encoding method and their associated tail lengths are possible. In some embodiments, all fields of a PPDU after the VS-SIG are customized and the customizations are identified by the vendor-specific language. In some embodiments, if the VS-SIG is included in the PPDU, the extended duration of the PPDU is indicated, for example, in the L-SIG and, if present, the RL-SIG too.

Figure 5:
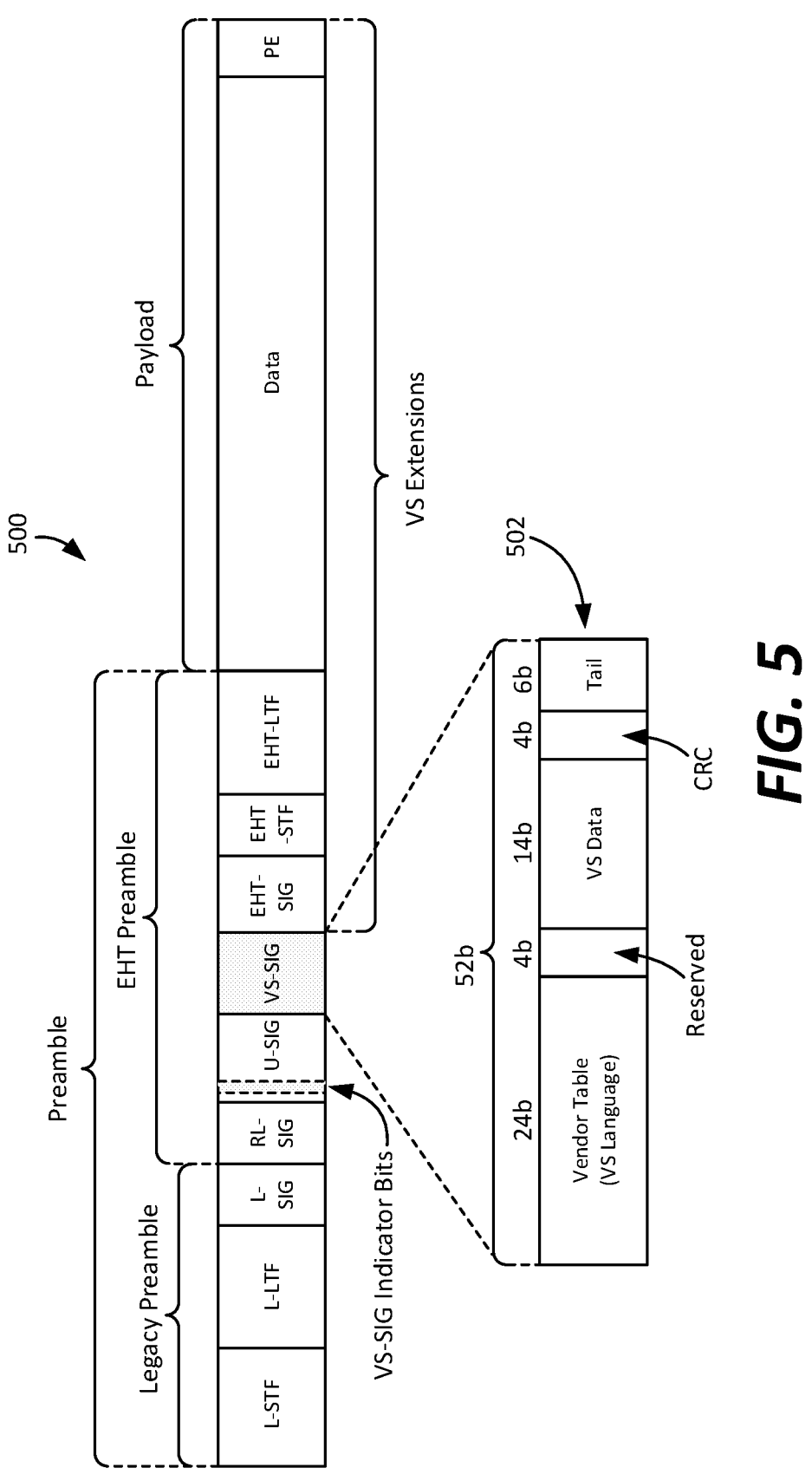
FIG. 5 provides a detailed view of another example format for a VS-SIG of a PPDU according to one or more embodiments.

FIG. 5 provides a detailed view of another example format for a VS-SIG 502 of a PPDU 500 according to one or more embodiments. For the depicted embodiment of FIG. 5, the VS-SIG 502 is represented by two OFDM symbols and contains fifty-two (52) data bits and fifty-two (52) data subcarriers. The fifty-two (52) data bits can be modulated via Binary Phase-Shift Keying (BPSK)-r1/2, for example. In this regard, the VS-SIG can include multiple BPSK-modulated OFDM symbols. However, in alternative embodiments, other modulation schemes can be utilized: e.g., 1 OFDM symbol using QPSK-r1/2. The defined PPDU format can allow the selection between no VS-SIG or one of several VS-SIG formats, including 1) BPSK-r1/2 and 1 OFDM symbol; 1) BPSK-r1/2 and 2 OFDM symbols; 3) QPSK-r1/2 and 1 OFDM symbol); and 4) (e.g., 0) no VS SIG field.

As depicted in FIG. 5, the bits associated with the VS-SIG 502 can be allocated into: a Vendor Table, a Reserved field, vendor-specific data (or VS data), a Cyclic Redundancy Check (CRC), and a Tail. For the illustrated example embodiment of FIG. 5, twenty-four (24) bits are allocated to the Vendor Table, four (4) bits are allocated to the Reserved field, fourteen (14) bits are allocated to the VS data, four (4) bits are allocated to the CRC, and six (6) bits are allocated to the Tail. It will be appreciated that this is one example allocation of bits and that other allocations are contemplated. For instance, in other example embodiments, thirty-two (32) bits can be allocated to the Vendor Table, two (2) bits can be allocated to the Reserved field, eight (8) bits can be allocated to the VS data, four (4) bits can be allocated to the CRC, and six (6) bits can be allocated to the Tail. The subfields of the VS-SIG 502 of FIG. 5 can have the same functionality as described above with reference to the subfields of the VS-SIG 402 of FIG. 4.

In some example embodiments, the allocation scheme noted above with the twenty-four (24) bits allocated to the vendor table can be associated with an Organizationally Unique Identifier (OUI) that uniquely identifies a vendor and the vendor-specific language associated with the vendor. In further example embodiments, the allocation scheme noted above with the thirty-two (32) bits allocated to the vendor table can be associated with an Organizational Identifier (OI) that uniquely identifies a vendor and the vendor-specific language associated with the vendor.

Figure 6:
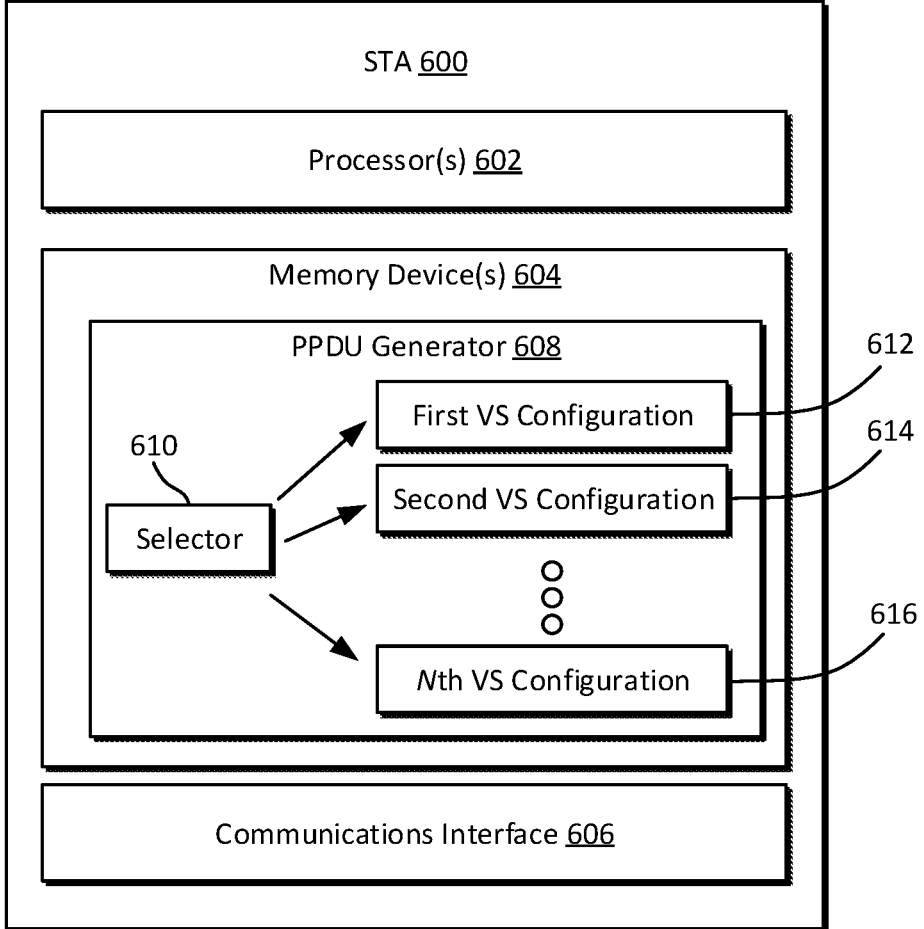
FIG. 6 is a schematic block diagram of a station configured to generate a PPDU with a vendor-specific signal field.

In some further embodiments, a PPDU can be generated such that the VS-SIG can be configured in one of a plurality of possible configurations. With reference now to FIG. 6, FIG. 6 is a schematic block diagram of a station (STA), or STA 600, configured to generate a PPDU with a VS-SIG. The STA 600 can be an access point or a client, for example. As depicted, the STA 600 includes one or more processors 602, one or more memory devices 604 (e.g., one or more non-transitory memory devices), and a communications interface 606 operable to transmit and/or receive transmissions, such as PPDUs. The one or more memory devices 604 can include instructions, such as computer-readable instructions, that, when executed by the one or more processors 602, can cause the one or more processors 602 to perform one or more operations, such as configuring a PPDU.

As depicted in FIG. 6, the instructions stored on the one or more memory devices 604 include a PPDU generator 608, which, when executed by the one or more processors 602, can cause the one or more processors 602 of the STA 600 to generate a PPDU. The PPDU generator 608 includes a selector 610 that represents logic or instructions for selecting a particular configuration for a VS-SIG in a PPDU. As shown, when the PPDU generator 608 is executed, the selector 610 can select between one of a plurality of possible configurations for the VS-SIG, such a first VS configuration 612, a second VS configuration 614, and so on to an Nth VS configuration 616. The plurality of possible configurations for the VS-SIG can include N number of possible configurations, wherein N is an integer greater than one (1).

In some particular example embodiments, the PPDU can be generated in a particular vendor-specific configuration based at least in part on a characteristic associated with the VS data to be included in the VS-SIG. One example characteristic is the size of the vendor-specific data. In this regard, when the PPDU generator is executed by the one or more processors, the selector 610 can determine or receive information indicating a size of the vendor-specific data, e.g., to be included in the VS-SIG. Then, based at least in part on the size of the vendor-specific data, the selector 610 can select one of the plurality of possible vendor-specific configurations for the VS-SIG. Other characteristics are also contemplated, such as a type and/or classification of the VS data to be included in the VS-SIG.

As one example, a first number of bits can be allocated to the VS data in a first predefined VS configuration and a second number of bits can be allocated to the VS data in a second predefined VS configuration. In this example, the second number of bits includes a greater number of bits than does the first number of bits. The selector can select the first predefined VS configuration or the second predefined VS configuration based at least in part on the size of the VS data to be included in the VS-SIG. For instance, if the number of bits needed for the VS-SIG exceeds the first number of bits, then the selector 610 can select the second predefined VS configuration so that the VS data can be accommodated in the VS-SIG. In contrast, if the number of bits does not exceed the first number of bits, then the selector 610 can select the first predefined VS configuration, e.g., to reduce the overall duration of the VS-SIG or make bits available for other needs. The VS-SIG can be configured in the first predefined VS configuration or the second predefined VS configuration based at least in part on the selection by the selector 610. Once configured, the one or more processors 602 of the STA 600 can generate the PPDU and cause transmission of the PPDU over a network.

In some example embodiments, one of the possible predefined VS configurations in which the VS-SIG can be configured can be a configuration in which the VS-SIG is represented by a single OFDM symbol, e.g., similar to the VS-SIG depicted in FIG. 4. Another one of the possible predefined VS configurations in which the VS-SIG can be configured can be a configuration in which the VS-SIG is represented by two (2) OFDM symbols, e.g., similar to the VS-SIG depicted in FIG. 5. In some further embodiments, the VS-SIG is only configurable in a single predefined VS configuration.

Once a PPDU having one or more VS indicator bits, possibly one or more validation bits, and possibly a VS-SIG is generated, one or more processors (e.g., of a station generating the PPDU) can cause the generated PPDU to be transmitted. For instance, the STA 600 of FIG. 6 can cause the communications interface 606 (e.g., one or more antennas thereof) to transmit the PPDU to, e.g., one or more other stations. A station receiving the PPDU, or rather a receiving station, can process the PPDU in accordance with inventive aspects of the present disclosure.

Particularly, a receiving station can receive the transmitted PPDU. One or more processors of the receiving station can determine whether the transmitted PPDU contains a vendor-specific signal field, or VS-SIG. When the one or more processors of the receiving station determine that the transmitted PPDU does not contain the VS-SIG, the PPDU can be processed as normal, or rather, according to one or more known IEEE 802.11 protocols. When the one or more processors of the receiving station determine that the transmitted PPDU does contain the VS-SIG, decode the PPDU using a decoding technique. With the PPDU decoded, the one or more processors of the receiving station can extract the vendor identity of the transmitting station (e.g., the transmitting station) as well as the vendor-specific language, or VS language. For instance, the one or more processors can process a vendor table of the VS-SIG, which can include bits that identify the vendor of the transmitting station and thereby the VS language associated with the vendor. The one or more processors of the receiving station can then ascertain whether the receiving station understands or is supported by the extracted VS language presented in the PPDU.

When the one or more processors of the receiving station ascertain that the receiving station does not understand or is not supported by the extracted VS language presented in the PPDU, the one or more processors of the receiving station can defer for a duration of the PPDU indicated by a field in the preamble (e.g., in an L-SIG), and in some implementations, apply length refinement information indicated in a field of the preamble (e.g., in a U-SIG). In this way, the one or more processors of the receiving station can essentially ignore the data of the PPDU presented in the unsupported VS language, and if possible, implement length refinement measures, which can save computing resources for other tasks, among other benefits. When the one or more processors of the receiving station ascertain that the receiving station does understand or support the extracted VS language presented in the PPDU, the one or more processors of the receiving station can process the PPDU in a vendor-specific manner, or rather using the VS extensions, e.g., in accordance with the VS data presented in the PPDU.

Accordingly, advantageously, a receiving station can process a PPDU containing vendor-specific PHY features in a standardized way.

In some further embodiments, it can be advantageous to mix vendor-specific and non-vendor specific functionality in the same multi-user PPDU. For instance, a PPDU can indicate the presence of vendor-specific extensions for the recipients that understand them, and can be transmitted to other recipients in a manner that allows them to receive the PPDU as usual, apart from a VS-SIG that such stations should largely ignore. Meanwhile, the PPDU can include some vendor-specific extensions that can make the PPDU only receivable by recipients that understand the particular vendor-specific extensions. Accordingly, as noted above, the PPDU can include one or more validation bits (e.g., as shown in FIG. 2) that signal to a receiving station that a validation operation is to be performed. In a first aspect, if the indication is that validation is not required, then a recipient that decodes the VS-SIG and determines it does not understand the vendor-specific language skips over the rest of the VS-SIG and processes the rest of the PPDU as usual (see e.g., the process leading to block S10 in FIG. 8). In a second aspect, if the indication is that validation is required, then a recipient that decodes the VS-SIG and determines it does not understand the vendor-specific language ignores the rest of the PPDU (but continues to assert CCA for the remaining duration of the PPDU) (see e.g., the process leading to block S13 in FIG. 8). In a third aspect, regardless of whether validation is indicated as required or not, a recipient that decodes the VS-SIG and determines that it does understand the vendor-specific language processes the rest of the PPDU using the vendor-specific information (see e.g., the processes leading to block S11 in FIG. 8).

Figure 7:
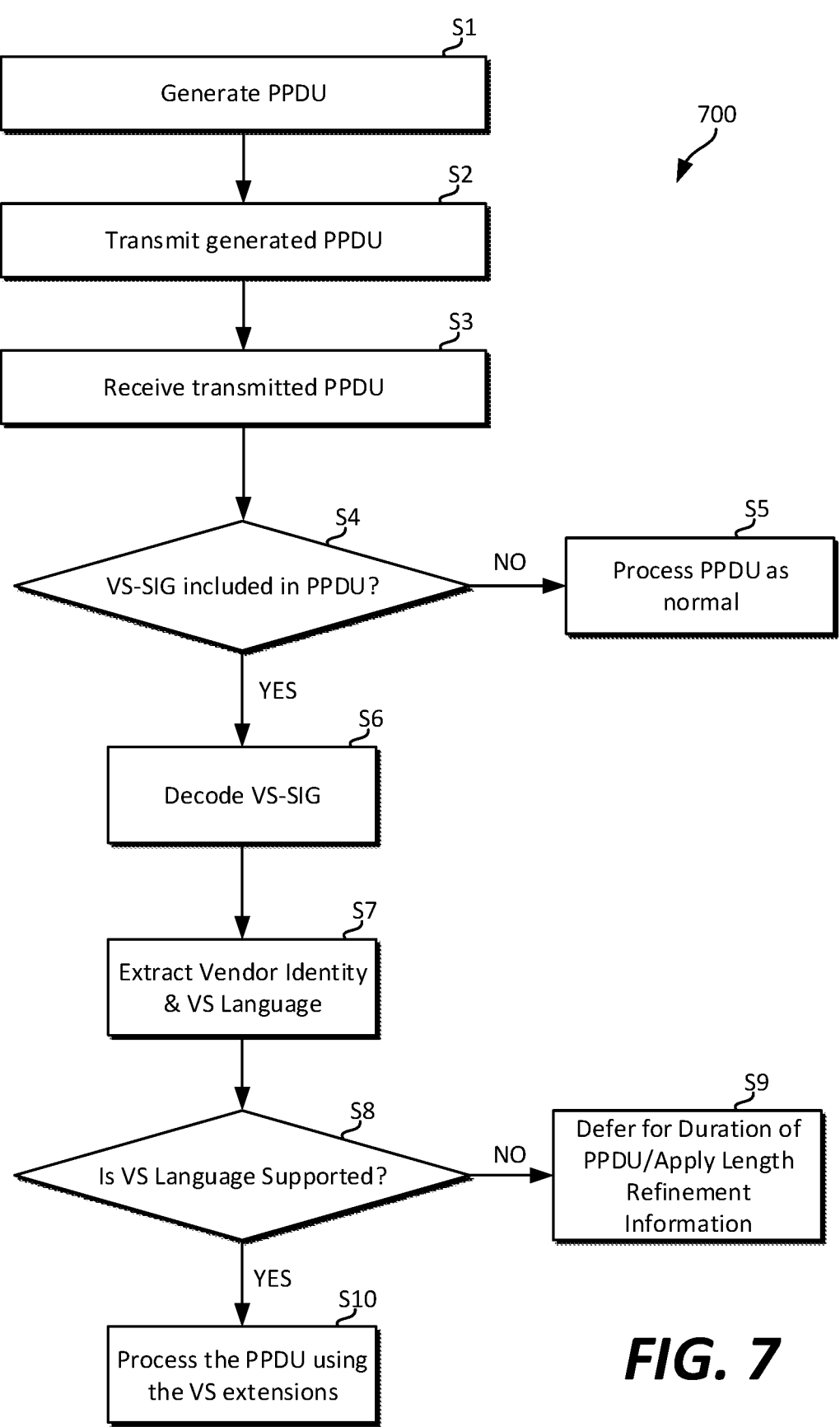
FIG. 7 is a flow diagram for a method according to one or more embodiments.

FIG. 7 is a flow diagram for a method 700 according to one or more embodiments.

At S1, the method 700 can include generating, by a first station, a PPDU. For instance, one or more processors of the first station, in executing instructions stored on one or more memory devices of the first station, can cause the PPDU to be generated. In some implementations, the first station can be an access point of an IEEE 802.11 wireless network. In other implementations, the first station can be a client of an access point associated with an IEEE 802.11 wireless network.

Notably, and in accordance with the inventive aspects of this disclosure, generating the PPDU can include generating the PPDU to include a payload and a preamble. The preamble can include a field having one or more bits identifying whether a vendor-specific signal field (VS-SIG) is present in the PPDU. The one or more bits identifying whether the VS-SIG is present can be referred to as "VS-SIG indicator bits". The VS-SIG indicator bits can be in any field of the preamble, such as a U-SIG as depicted in FIGS. 2 through 5. In some implementations, the field having the one or more bits identifying whether the VS-SIG is present in the PPDU is positioned before the VS-SIG. In yet other implementations, the one or more bits identifying whether the VS-SIG is present in the PPDU (or the "VS-SIG indicator bits") are in a field other than the VS-SIG itself.

Further, in some instances, the preamble can include the VS-SIG. The VS-SIG can include one or more bits identifying a vendor-specific language (or VS language) in which vendor-specific data (or VS data) is presented. For instance, the VS-SIG can include a vendor table that includes bits that identify the vendor of the transmitting station (e.g., the first station) and thereby the VS language associated with the vendor. The VS-SIG can also include one or more bits representing the VS data in the VS language. For instance, the VS-SIG can include a VS data field including the VS data in the VS language. In some implementations, the VS-SIG is represented by a single OFDM symbol. In some other implementations, the VS-SIG is represented by at least two OFDM symbols (e.g., two OFDM symbols). Whenever the VS-SIG is included in the PPDU, the extended duration of the PPDU as indicated in the L-SIG or other signal field that indicates the duration of the PPDU. In yet further implementations, all fields of the PPDU after the VS-SIG are represented in the vendor-specific language.

In some further implementations, generating the PPDU can include selecting a configuration for the VS-SIG, e.g., based at least in part on one or more characteristics associated with the VS data to be included in the VS-SIG, the vendor of the transmitting station, some other criteria, a combination thereof, etc. A selector, or set of instructions, can be executed by one or more processors of the first station to select a predefined vendor-specific configuration in which the VS-SIG is to be configured. In some example implementations, the predefined vendor-specific configuration can be selected based at least in part on the size of the VS data to be included in the VS-SIG. Particularly, the method can include determining a size of the vendor-specific data; selecting, based at least in part on the size of the vendor-specific data, one of: a first predefined vendor-specific configuration in which a first number of bits are allocated to the vendor-specific data; and a second predefined vendor-specific configuration in which a second number of bits are allocated to the vendor-specific data. The second number of bits includes a greater number of bits than does the first number of bits. In such implementations, the VS-SIG is configured in the first predefined vendor-specific configuration or the second predefined vendor-specific configuration based at least in part on the selecting, or rather, the VS-SIG is configured with the predefined vendor-specific configuration selected by the selector. The selector may also account for how the vendor can identify themselves. For example, if a vendor only has an OUI or OI for identification, then the vendor cannot use a VS-SIG with only twenty-six (26) bits.

In some implementations, the first predefined vendor-specific configuration has a modulation scheme and number of OFDM symbols associated therewith and the second predefined vendor-specific configuration has a modulation scheme and number of OFDM symbols associated therewith. In such implementations, at least one of: i) the modulation scheme of the first predefined vendor-specific configuration is different than the modulation scheme of the second predefined vendor-specific configuration, and ii) the number of OFDM symbols of the first predefined vendor-specific configuration is different than the number of OFDM symbols of the second predefined vendor-specific configuration.

At S2, the method 700 can include transmitting, by the first station, the generated PPDU. For instance, one or more processors of the first station, in executing instructions stored on one or more memory devices of the first station, can cause the PPDU to be transmitted, e.g., over an IEEE 802.11 wireless network. The first station can transmit the generated PPDU to one or more other stations, such as a second station. The transmitted PPDU can include a payload and a preamble. The preamble includes a field having one or more bits identifying whether a VS-SIG is present in the PPDU. The VS-SIG, when present, includes one or more bits identifying a vendor-specific language in which vendor-specific data is presented. The VS-SIG also includes, when present, one or more bits representing the vendor-specific data in the vendor-specific language. Validate signaling can also be present.

At S3, the method 700 can include receiving, by a second station, the transmitted PPDU. For instance, one or more processors of the second station, in executing instructions stored on one or more memory devices of the second station, can receive the transmitted PPDU, which includes the one or more bits identifying whether a VS-SIG is present, and if present, the VS-SIG. The second station can include one or more processors, one or more memory devices, and a communication interface, among other components.

At S4, the method 700 can include determining, by the second station, whether the transmitted PPDU contains a vendor-specific signal field, or VS-SIG. For instance, the one or more processors of the second station can determine whether the transmitted PPDU contains a VS-SIG by processing the VS-SIG indicator bits, or one or more bits identifying whether the VS-SIG is present in the PPDU. By processing the VS-SIG indicator bits, the one or more processors of the second station can determine whether a VS-SIG is present in the received PPDU.

At S5, in response to the second station determining at S4 that the transmitted PPDU does not contain the VS-SIG, the method 700 can include processing the PPDU as normal, or rather, according to one or more known IEEE 802.11 protocols. For instance, the one or more processors of the second station can, upon determining that the transmitted PPDU does not contain the VS-SIG, process the PPDU as normal, e.g., in view of the common language represented in the PPDU.

At S6, in response to the second station determining at S4 that the transmitted PPDU does contain the VS-SIG, the method 700 can include decoding the VS-SIG. For instance, the one or more processors of the second station can, upon determining that the transmitted PPDU contains the VS-SIG, decode the VS-SIG. Any suitable decoding technique can be utilized.

At S7, the method 700 can include extracting the vendor identity of a vendor associated with the station that transmitted the PPDU (e.g., the first station) thereby enabling determination of the vendor-specific language, or VS Language. For instance, the one or more processors of the second station can, after decoding the VS-SIG, extract the vendor identity of the transmitting station (e.g., the first station), which enables determination of the VS language. For instance, the one or more processors can process a vendor table of the VS-SIG. The vendor table can include bits that identify the vendor of the transmitting station (e.g., the first station) and the VS language associated with the vendor. In some implementations, the vendors can have at least one uniquely assigned VS language. Some vendors can have multiple unique VS languages.

At S8, the method 700 can include ascertaining, by the second station, whether the extracted vendor-specific language of the vendor associated with the station that transmitted the PPDU (e.g., the first station) is supported by the second station. For instance, the one or more processors of the second station can ascertain whether the second station understands or is at least minimally supports the feature indicated by the extracted VS language presented in the PPDU.

At S9, in response to the second station ascertaining at S8 that the extracted VS language is not supported, the method 700 can include deferring, by the second station, for a duration of the PPDU indicated by a field in the preamble (e.g., in an L-SIG), and in some implementations, applying length refinement information indicated in a field of the preamble (e.g., in a U-SIG). In this way, the one or more processors of the second station can essentially ignore the data of the PPDU presented in the unsupported VS language, and if possible, implement length refinement measures.

At S10, in response to the second station ascertaining at S8 that the extracted VS language is supported, the method 700 can include processing the PPDU in a vendor-specific manner, e.g., in accordance with the VS data presented in the PPDU. For instance, the one or more processors of the second station can process the VS data included in the VS-SIG in accordance with the understood VS language. The one or more processors can then process the remainder of the PPDU in accordance with the VS data. In some implementations, every field after the VS-SIG can be presented in the VS language.

Figure 8:
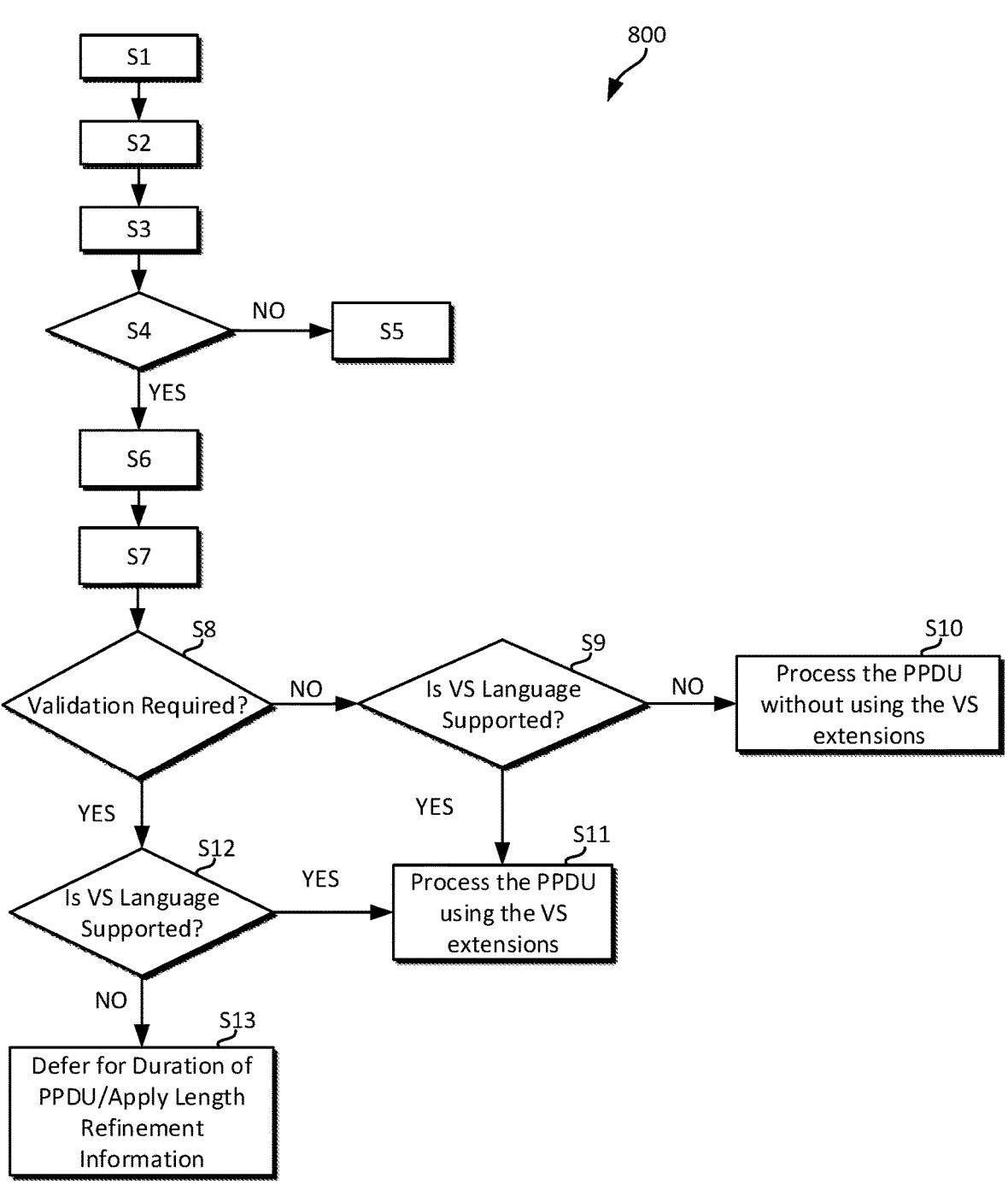
FIG. 8 is a flow diagram for a method according to one or more embodiments.

FIG. 8 is a flow diagram for a method 800 according to one or more embodiments. The operations or steps S1 through S7 of method 800 are the same as in the method 700. Accordingly, for the sake of brevity, these operations or steps will not be repeated below. Generally, the method 800 provides an implementation that includes a validation operation, and depending on whether validation is required and whether the VS language in the PPDU is understood or supported by a receiving station (e.g., the second station), the PPDU can be processed differently.

At S8, after extracting the vendor identity of a vendor associated with the station that transmitted the PPDU (e.g., the first station) thereby enabling determination of the VS Language at S7, the method 800 can include determining, by the second station, whether the PPDU indicated whether validation is required. For instance, the PPDU can include one or more bits indicating whether validation is required, or rather, one or more validation bits. The one or more validation bits can be within the U-SIG (e.g., as shown in FIG. 2), within the VS-SIG itself, or in some other field of the preamble. The one or more processors of the second station can determine whether the validation bits, if present, indicate whether validation is required.

At S9, the method 800 can include ascertaining, by the second station, whether the extracted vendor-specific language of the vendor associated with the station that transmitted the PPDU (e.g., the first station) is supported by the second station. For instance, the one or more processors of the second station can ascertain whether the second station understands or is at least minimally supports the feature indicated by the extracted VS language presented in the PPDU.

At S10, in response to the second station ascertaining that the second station vendor-specific language is not supported or understood by the second station at S9, the method 800 can include processing the PPDU without using the VS extensions. For instance, in response to the VS language not being support or understood, the one or more processors of the second station can skip over the rest of the VS-SIG and process the PPDU as normal.

At S11, in response to the second station ascertaining that the second station vendor-specific language is supported or understood by the second station, the method 800 can include processing the PPDU using the VS extensions. In such a case, even though validation is not required at S8, the PPDU is processed in accordance with the VS extensions when the VS language is supported or understood by the second station.

At S12, in response to the second station determining that validation is required at S8, the method 800 can include ascertaining, by the second station, whether the extracted vendor-specific language of the vendor associated with the station that transmitted the PPDU (e.g., the first station) is supported by the second station. For instance, the one or more processors of the second station can ascertain whether the second station understands or is at least minimally supports the feature indicated by the extracted VS language presented in the PPDU.

In response to the second station ascertaining that the second station vendor-specific language is supported or understood by the second station at S12, the method 800 can include processing the PPDU using the VS extensions at S11. In such a case, validation is required at S8 and the VS language is ascertained to be supported at S12, and accordingly, the PPDU is processed in accordance with the VS extensions at S11.

At S13, in response to the second station ascertaining that the vendor-specific language is not supported or understood by the second station at S12, the method 800 can include deferring, by the second station, for a duration of the PPDU indicated by a field in the preamble (e.g., in an L-SIG), and in some implementations, applying length refinement information indicated in a field of the preamble (e.g., in a U-SIG). In this way, the one or more processors of the second station can essentially ignore the data of the PPDU presented in the unsupported VS language, and if possible, implement length refinement measures. Even in ignoring the remainder of the PPDU, the second station can still continue to assert Clear Channel Assessment (CCA) for the remaining duration of the PPDU.

To summarize, in accordance with the method 800, when validation is not required and the VS language is not supported by the receiving station (e.g., the second station), the PPDU can be processed by the second station without using the VS extensions (e.g., at S10). In contrast, when validation is required and the VS language is not supported by the receiving station (e.g., the second station), the second station can defer and skip over the remainder of the PPDU (e.g., at S13). Further, regardless of whether validation is required at S8, if the receiving station understands or supports the VS language in the PPDU, the PPDU is processed at S11 using the VS extensions.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.), or an embodiment combining software and hardware aspects that may all generally be referred to herein as a "circuit", "module", or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method, comprising:
performing at least one of: generating, transmitting, and receiving a physical layer protocol data unit (PPDU), the PPDU comprising:
a payload; and
a preamble, comprising:
a field having one or more bits identifying whether a vendor-specific signal field (VS-SIG) is present in the PPDU;
the VS-SIG including one or more bits identifying a vendor-specific language in which vendor-specific data is presented, wherein all fields of the PPDU after the VS-SIG are represented in the vendor-specific language; and
one or more bits representing the vendor-specific data in the vendor-specific language.

16

2. The method of claim 1, wherein the field having the one or more bits identifying whether the VS-SIG is present in the PPDU is a universal signal field (U-SIG).

3. The method of claim 1, wherein the field having the one or more bits identifying whether the VS-SIG is present in the PPDU is positioned before the VS-SIG.

4. The method of claim 1, wherein the PPDU further comprises one or more validation bits indicating whether a receiving station is required to understand vendor-specific extensions of the PPDU in order to process a remainder of the PPDU.

5. The method of claim 1, wherein the one or more bits identifying the vendor-specific language in the VS-SIG is represented by a vendor table.

6. The method of claim 1, wherein the VS-SIG is represented by a single OFDM symbol.

7. The method of claim 1, wherein the VS-SIG is represented by at least two OFDM symbols.

8. The method of claim 1, wherein the one or more bits identifying whether the VS-SIG is present in the PPDU are in a field other than the VS-SIG itself.

9. The method of claim 1, wherein the PPDU is received by a station, and wherein the method further comprises:
decoding, by the station, the VS-SIG;
extracting, by the station, a vendor identity to determine the vendor-specific language; and
determining, by the station, whether validation is required, as indicated by one or more validation bits in the PPDU.

10. The method of claim 9, further comprising:
in response to the station determining that validation is required, ascertaining whether the station supports the vendor-specific language; and
in response to the station ascertaining that the vendor-specific language is not supported by the station, ignoring, by the station, a remainder of the PPDU for a duration of the PPDU.

11. The method of claim 10, further comprising:
in response to the station determining that validation is not required, ascertaining whether the station supports the vendor-specific language; and
in response to the station ascertaining that the vendor-specific language is not supported by the station, processing, by the station, a remainder of the PPDU without processing vendor-specific extensions of the PPDU.

12. The method of claim 10, further comprising:
regardless of whether validation is required and upon ascertaining that the station supports the vendor-specific language, processing the PPDU using vendor-specific extensions of the PPDU.

13. A method, comprising:
performing at least one of: generating, transmitting, and receiving a physical layer protocol data unit (PPDU), the PPDU comprising:
a payload; and
a preamble, comprising:
a field having one or more bits identifying whether a vendor-specific signal field (VS-SIG) is present in the PPDU;
the VS-SIG including one or more bits identifying a vendor-specific language in which vendor-specific data is presented; and
one or more bits representing the vendor-specific data in the vendor-specific language,
the method further comprising:
determining a size of the vendor-specific data;

selecting, based at least in part on the size of the vendor-specific data, one of:

a first predefined vendor-specific configuration where a first number of bits are allocated to the vendor-specific data; and a second predefined vendor-specific configuration where a second number of bits are allocated to the vendor-specific data, the second number of bits includes a greater number of bits than the first number of bits, and wherein the VS-SIG is configured in the first predefined vendor-specific configuration or the second predefined vendor-specific configuration based at least in part on the selecting.

14. The method of claim 13, wherein the first predefined vendor-specific configuration has a modulation scheme and number of OFDM symbols associated therewith and the second predefined vendor-specific configuration has a modulation scheme and number of OFDM symbols associated therewith, and wherein at least one of:

the modulation scheme of the first predefined vendor-specific configuration is different than the modulation scheme of the second predefined vendor-specific configuration, and the number of OFDM symbols of the first predefined vendor-specific configuration is different than the number of OFDM symbols of the second predefined vendor-specific configuration.

15. A method, comprising:

performing at least one of: generating, transmitting, and receiving a physical layer protocol data unit (PPDU), the PPDU comprising:

a payload; and a preamble, comprising:

a field having one or more bits identifying whether a vendor-specific signal field (VS-SIG) is present in the PPDU;

the VS-SIG including one or more bits identifying a vendor-specific language in which vendor-specific data is presented; and one or more bits representing the vendor-specific data in the vendor-specific language, wherein the PPDU is received by a station, and wherein the method further comprises:

determining, by the station, whether the PPDU includes the VS-SIG;

in response to determining, by the station, that the PPDU includes the VS-SIG, decoding the VS-SIG;

extracting a vendor identity; and ascertaining whether the station supports the vendor-specific language.

16. The method of claim 15, further comprising:

in response to ascertaining that the station supports the vendor-specific language, processing the PPDU in accordance with the vendor-specific data.

17. The method of claim 16, further comprising:

in response to ascertaining that the station does not support the vendor-specific language, deferring for a duration of the PPDU indicated by a field in the preamble; and applying length refinement information indicated in a field of the preamble.

\* \* \* \* \*